(12) United States Patent
Song et al.

(10) Patent No.: US 12,372,264 B2
(45) Date of Patent: Jul. 29, 2025

(54) SYSTEM AND METHOD FOR RESIDENTIAL HVAC CONTROL

(71) Applicant: The Board of Regents of the University of Oklahoma, Norman, OK (US)

(72) Inventors: Li Song, Norman, OK (US); Choon Y. Tang, Norman, OK (US); Junke Wang, Norman, OK (US); Yilin Jiang, Norman, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 480 days.

(21) Appl. No.: 17/747,688

(22) Filed: May 18, 2022

(65) Prior Publication Data

US 2022/0381470 A1    Dec. 1, 2022

Related U.S. Application Data

(60) Provisional application No. 63/190,027, filed on May 18, 2021.

(51) Int. Cl.
*F24F 11/63* (2018.01)
*G05B 19/042* (2006.01)

(52) U.S. Cl.
CPC ............ *F24F 11/63* (2018.01); *G05B 19/042* (2013.01); *G05B 2219/2614* (2013.01)

(58) Field of Classification Search
CPC . F24F 11/63; G05B 19/042; G05B 2219/2614
See application file for complete search history.

(56) References Cited

U.S. PATENT DOCUMENTS

| 10,885,238 | B1* | 1/2021 | Packer | G06F 30/20 |
| 2006/0191275 | A1* | 8/2006 | Jung | F24F 3/065 |
| | | | | 62/230 |
| 2007/0265866 | A1* | 11/2007 | Fehling | G06Q 10/08 |
| | | | | 340/506 |
| 2012/0330626 | A1* | 12/2012 | An | G01K 17/20 |
| | | | | 703/2 |
| 2015/0045967 | A1* | 2/2015 | Mori | F24F 11/64 |
| | | | | 700/277 |

(Continued)

FOREIGN PATENT DOCUMENTS

KR    2018082764 A  *  7/2018  ............. F24D 19/10

*Primary Examiner* — Michael W Choi
(74) *Attorney, Agent, or Firm* — Dunlap Codding, P.C.

(57) ABSTRACT

Heating, ventilation and air conditioning (HVAC) systems and methods of use are described. The HVAC system includes at least one internal surface temperature sensor configured to provide an interior wall surface temperature measurement. The internal surface temperature sensor is positioned on an interior surface of an external wall of the residential house. The HVAC system also includes a control system in communication over a network with the internal surface temperature sensor. The control system is configured to obtain the interior wall surface temperature measurement and apply a home heat transfer model to determine a predicted space air temperature. The home heat transfer model is based on thermal dynamics of space air and building structure using the interior wall surface temperature measurement.

20 Claims, 5 Drawing Sheets

(56) References Cited

U.S. PATENT DOCUMENTS

| | | | |
|---|---|---|---|
| 2016/0334123 A1* | 11/2016 | Humann | F24F 11/62 |
| 2017/0089771 A1* | 3/2017 | Ahmad | G01N 25/18 |
| 2017/0090070 A1* | 3/2017 | Root | G01W 1/08 |
| 2017/0179716 A1* | 6/2017 | Vitullo | G05B 13/04 |
| 2018/0081330 A1* | 3/2018 | Haslett | H04L 12/2816 |
| 2018/0266704 A1* | 9/2018 | Markow | F24D 3/02 |
| 2019/0287147 A1* | 9/2019 | Ingale | F25B 49/022 |
| 2020/0096225 A1* | 3/2020 | Sawada | F24F 13/22 |
| 2020/0166230 A1* | 5/2020 | Ng | F24F 11/56 |

\* cited by examiner

SYSTEM AND METHOD FOR RESIDENTIAL HVAC CONTROL

CROSS REFERENCE TO RELATED APPLICATIONS/INCORPORATION BY REFERENCE STATEMENT

The present patent application incorporates by reference the entire provisional patent application identified by U.S. Ser. No. 63/190,027, filed on May 18, 2021, and claims priority thereto under 35 U.S.C. 119(e).

STATEMENT REGARDING FEDERALLY SPONSORED RESEARCH AND DEVELOPMENT

This invention was made with government support under Project No. EE0008697, awarded by the United States Department of Energy. The government has certain rights in the invention.

BACKGROUND

Generally, solar radiation transfers heat inside a home through a thermal envelope. The thermal envelope consists of all structural elements that separate the conditioned indoor spaces from unconditioned indoor spaces and outdoors. Solar radiation transfers heat via two mechanisms. One mechanism is to heat the exterior opaque surfaces of the home. The heat received by the opaque surfaces via the opaque envelope elements is absorbed by the total heat capacity of the opaque envelopes first, and then released into the indoor air through conduction and convection. The other mechanism is to heat indoor structural components and furnishings through glazing provided by solar radiation of windows and skylights. Some of the solar heat gain absorbed by interior furnishings and structural components (e.g., walls) is immediately transferred to the indoor air by convection. The remaining is conducted into the structure or furnishings and gradually released later, thus heating the indoor air. In a traditional resistance-capacitance (RC) thermal model, the two mechanisms are determined separately. For example, the heat transfer of solar radiation on the exterior surfaces of opaque structural components is described by a sol-air temperature, which is orientation-dependent. The solar heat gain through fenestration, however, is separately described as radiative heat gains.[1]

For homes, the dominant thermal mass (i.e., the product of the mass and the specific heat capacity) comes from the thermal envelope.[2, 3] The heat capacity per specific volume of concrete, glass, wood, plastic, and materials for thermal envelope elements may be as much as a thousand times higher than the heat capacity per volume of air. The volume of the thermal envelope in a residential building may be significantly larger than the volume of partition walls and furnishings. However, internal heat gains may have a relatively small impact as compared with heat gains and losses of the thermal envelope.[4]

Current "smart" thermostats only measure space air temperature. To optimize residential air conditioning (AC) operations, a home heat transfer model that is able to capture the thermal dynamics of space air and building structure is needed within the art.

BRIEF DESCRIPTION OF THE DRAWINGS

Several embodiments of the present disclosure are hereby illustrated in the appended drawings. It is to be noted that the appended drawings only illustrate several typical embodiments and are therefore not intended to be considered limiting of the scope of the present disclosure. Further, in the appended drawings, like or identical reference numerals or letters may be used to identify common or similar elements and not all such elements may be so numbered. The figures are not necessarily to scale and certain features and views of the figures may be shown as exaggerated in scale or in schematic in the interest of clarity and conciseness.

DETAILED DESCRIPTION

Figure 1:
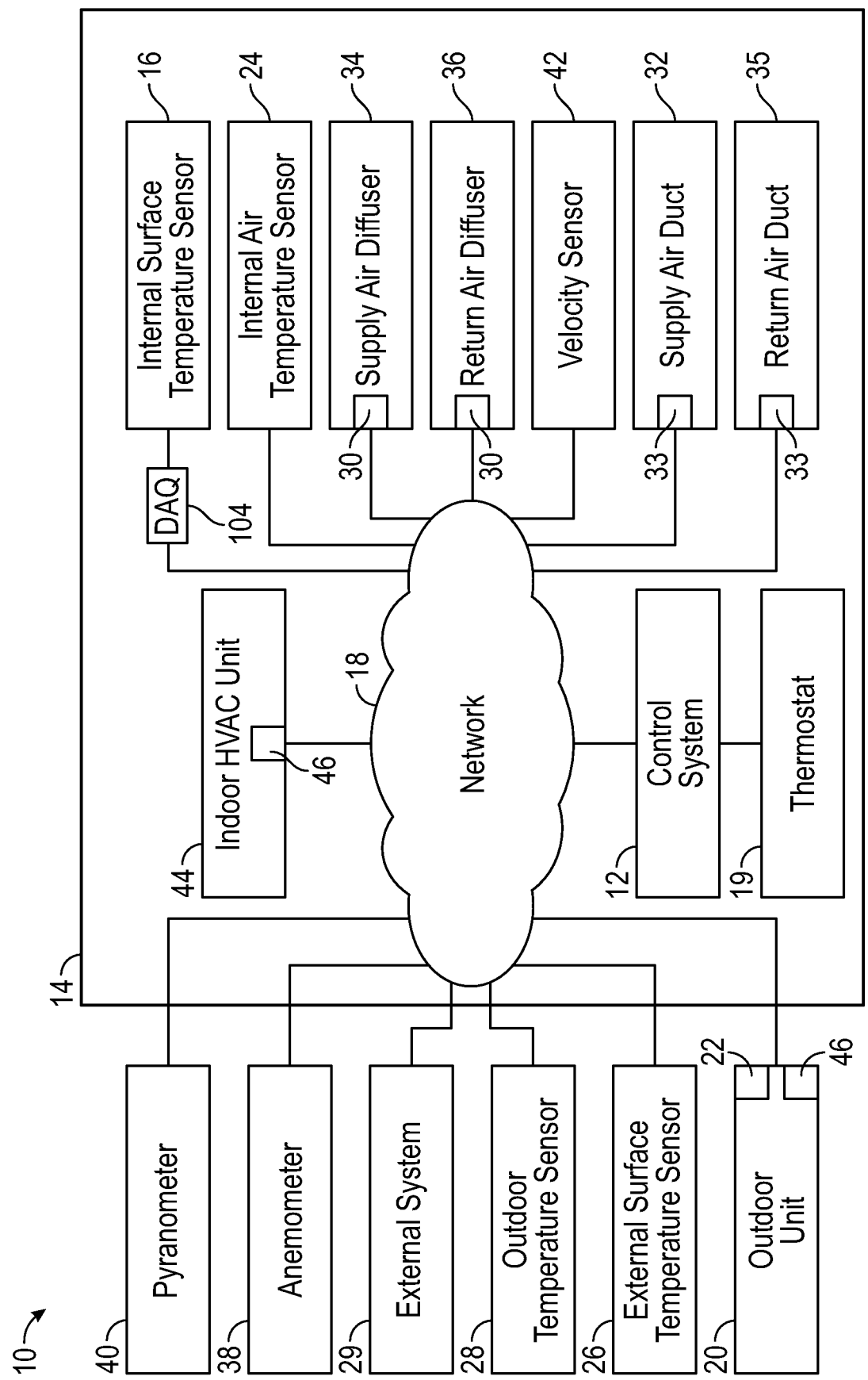
FIG. 1 is a block diagram of an exemplary embodiment of a residential heating, ventilation, and air conditioning (HVAC) system in accordance with the present disclosure.

The present disclosure is directed to systems and methods for optimizing residential air conditioning (AC) operations using a home heat transfer model configured to capture thermal dynamics of space air and building structure within a virtual thermal envelope. The virtual thermal envelope consists of all structural elements (e.g., wall, roof, insulation, air/vapor retarders, windows, weather stripping, caulking, and the like) that separate conditioned indoor spaces from unconditioned indoor spaces and outdoors within a residential house. The space air is generally considered to be the air within the virtual thermal envelope. The building structure within the virtual thermal envelope includes structural components of the house (e.g., walls). In some non-limiting embodiments, the building structure may also include interior furnishings positioned within the virtual thermal envelope.

Generally, the system includes at least one interior wall surface temperature sensor communicating with a data acquisition system. In some non-limiting embodiments, the methods described herein include positioning, installation and operation of at least one interior wall surface temperature sensor within a residential house. In some non-limiting embodiments, at least one interior wall surface temperature sensor may provide measurement of interior wall surface temperatures. The interior wall surface temperature may be used in a home heat transfer model that provides a predicted space air temperature based on both thermal dynamics of space air and building structure within the virtual thermal envelope. In some non-limiting embodiments, the home heat transfer model may be based on a machine learning algorithm. In some embodiments, use of the home heat transfer model may be configured to facilitate smart home temperature regulation. For example, the predicted space air temperature based on both thermal dynamics of space air and building structure within the virtual thermal envelope may be used to provide optimal control of cooling and heating operations to save energy costs and/or demands.

Before describing various embodiments in more detail by way of exemplary description, examples, and results, it is to be understood that the present disclosure is not limited in application to the details of methods and compositions as set forth in the following description. The disclosure is capable of other embodiments or of being practiced or carried out in various ways. As such, the language used herein is intended to be given the broadest possible scope and meaning; and the embodiments are meant to be exemplary, not exhaustive. Also, it is to be understood that the phraseology and terminology employed herein is for the purpose of description and should not be regarded as limiting unless otherwise indicated as so. Moreover, in the following detailed description, numerous specific details are set forth in order to provide a more thorough understanding of the disclosure. However, it will be apparent to a person having ordinary skill in the art that the presently disclosed concepts may be practiced without these specific details. In other instances, features which are well known to persons of ordinary skill in the art have not been described in detail to avoid unnecessary complication of the description.

Unless otherwise defined herein, scientific and technical terms used herein shall have the meanings that are commonly understood by those having ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the present disclosure pertains. All patents, published patent applications, and non-patent publications referenced in any portion of this application are herein expressly incorporated by reference in their entirety to the same extent as if each individual patent or publication was specifically and individually indicated to be incorporated by reference.

All of the systems and methods of production and application thereof disclosed herein can be made and executed without undue experimentation in light of the present disclosure. While the systems and methods of the present disclosure have been described in terms of particular embodiments, it will be apparent to those of skill in the art that variations may be applied to the systems and/or methods and in the steps or in the sequence of steps of the method described herein without departing from the concept, spirit and scope of the inventive concepts. All such similar substitutes and modifications apparent to those of skilled in the art are deemed to be within the spirit and scope of the inventive concepts disclosed herein.

As utilized in accordance with the methods and compositions of the present disclosure, the following terms, unless otherwise indicated, shall be understood to have the following meanings:

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or when the alternatives are mutually exclusive, although the disclosure supports a definition that refers to only alternatives and "and/or." The use of the term "at least one" will be understood to include one as well as any quantity more than one, including but not limited to, 2, 3, 4, 5, 6, 7, 8, 9, 10, 11, 12, 13, 14, 15, 16, 17, 18, 19, 20, 21, 22, 23, 24, 25, 30, 35, 40, 45, 50, 55, 60, 65, 70, 75, 80, 85, 90, 95, 100, or more, or any integer inclusive therein. The term "at least one" may extend up to 1000 or more, depending on the term to which it is attached; in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y and Z.

As used in this specification and claims, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. For example, unless otherwise noted, a process, method, article, or apparatus that comprises a list of elements is not necessarily limited to only those elements, but may also include elements not expressly listed or inherent to such process, method, article or apparatus.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

Throughout this application, the term "about" is used to indicate that a value includes the inherent variation of error for the composition, the method used to administer the composition, or the variation that exists among the study subjects. Further, in this detailed description and the appended claims, each numerical value (e.g., temperature or time) should be read once as modified by the term "about" (unless already expressly so modified), and then read again as not so modified unless otherwise indicated in context. For example but not by way of limitation, when the term "about" is utilized, the designated value may vary by plus or minus fifteen percent, plus or minus twelve percent, or plus or minus eleven percent, or plus or minus ten percent, or plus or minus nine percent, or plus or minus eight percent, or plus or minus seven percent, or plus or minus six percent, or plus or minus five percent, or plus or minus four percent, or plus or minus three percent, or plus or minus two percent, or plus or minus one percent, or plus or minus one-half percent.

Also, any range listed or described herein is intended to include, implicitly or explicitly, any number within the range, particularly all integers, including the end points, and is to be considered as having been so stated. For example, "a range from 1 to 10" is to be read as indicating each possible number, particularly integers, along the continuum between about 1 and about 10, including for example 2, 3, 4, 5, 6, 7, 8, and 9. Similarly, fractional amounts between any two consecutive integers are intended to be included herein, such as, but not limited to, 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, and 0.95. For example, the range 3 to 4 includes, but is not limited to, 3.05, 3.1, 3.15, 3.2, 3.25, 3.3, 3.35, 3.4, 3.45, 3.5, 3.55, 3.6, 3.65, 3.7, 3.75, 3.8, 3.85, 3.9, and 3.95. Thus, even if specific data points within the range, or even no data points within the range, are explicitly identified or specifically referred to, it is to be understood that any data points within the range are to be considered to have been specified, and that the inventors possessed knowledge of the entire range and the points within the range.

As used herein, the term "substantially" means that the subsequently described event or circumstance completely occurs or that the subsequently described event or circumstance occurs to a great extent or degree. For example, the term "substantially" means that the subsequently described event or circumstance occurs at least 90% of the time, or at least 95% of the time, or at least 98% of the time, or comprises at least 90%, 95%, or 98% of the reference quantity.

Referring now to the figures, and in particular FIG. 1, shown therein is a residential heating, ventilation, and air conditioning (HVAC) system 10 in accordance with the present disclosure. The residential HVAC system 10 includes a control system 12 installed within a residential house 14. The control system 12 is configured to obtain interior wall surface temperature measurements from at least one internal surface temperature sensor 16 via a network 18. Using the interior wall surface temperature measurement from at least one internal surface temperature sensor 16, the residential HVAC system 10 may be optimized by a home heat transfer model to provide a predicted space air temperature based on both thermal dynamics of space air and building structure within a virtual thermal envelope. The control system 12 may communicate with a thermostat 19 (e.g., smart thermostat) to adjust temperature within the virtual thermal envelope based on the predicted space air temperature. In some non-limiting embodiments, the control system 12 may include the thermostat 19 configured to adjust temperature within the virtual thermal envelope based on the predicted space air temperature.

The home heat transfer model is configured to capture thermal dynamics of space air and building structure within the virtual envelope of the residential house 14. In addition to the interior wall surface temperature measurement, the control system 12 may obtain supply air and leaving air temperature measurements of at least one HVAC outdoor unit 20 via at least one outdoor unit sensor 22, internal air temperature of the residential house 14 via at least one internal air temperature sensor 24, external surface temperature outside of the residential house 14 via an external surface temperature sensor 26, external air temperature outside of the residential house 14 via at least one outdoor air temperature sensor 28 or external system 29 (e.g., mesonet network), supply air temperature at one or more supply air diffuser 34 via at least one air diffuser sensor 30, return air temperature at one or more return air diffuser 36 via at least one air diffuser sensor 30, supply air temperature and humidity at one or more supply air duct 32 via at least one temperature/humidity sensor 33, return air temperature and humidity at one or more return air duct 35 via at least one temperature/humidity sensor 33, wind speed about the residential house 14 via at least one anemometer 38, global horizontal solar irradiation upon the residential house 14 via at least one pyranometer 40, return air flow rate via at least one velocity sensor 42, and power consumptions for an indoor HVAC unit 44 and the HVAC outdoor unit 20 via at least one power meter 46.

Figure 2:
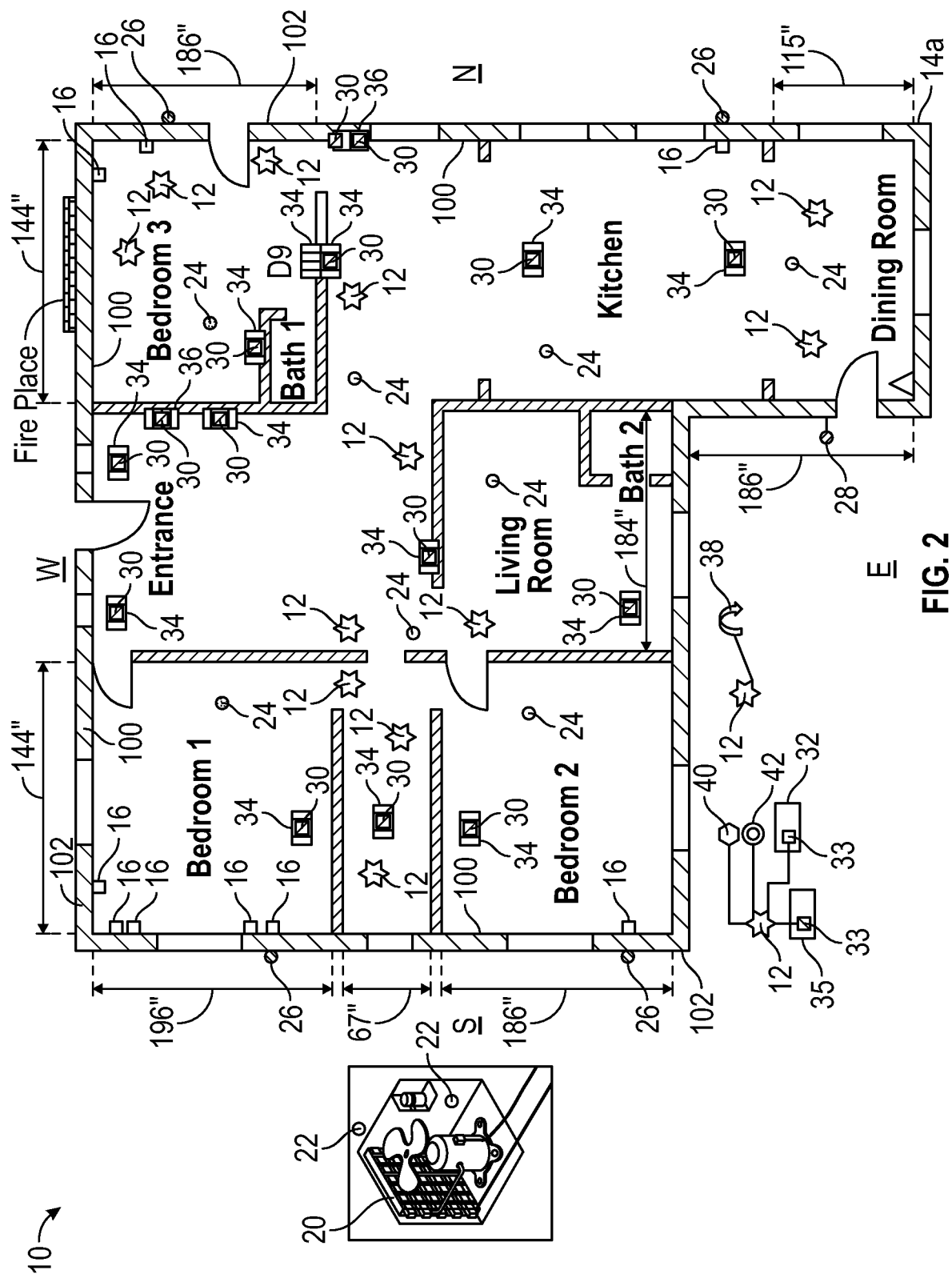
FIG. 2 is a floor plan of a residential house configured with the residential HVAC system illustrated in FIG. 1 in accordance with the present disclosure.

FIG. 2 illustrates a schematic diagram of the residential HVAC system 10 illustrated in FIG. 1 configured for use in a residential house 14a. The residential house 14a is an exemplary single-family, one-story home having a floor area of approximately 1,658 ft$^2$ and built in 1940. The residential house 14a illustrated in FIG. 2 includes 3.5 tons (42,000 Btu/h) of cooling capacity and 1,400 cfm of air flow rate. The residential house 14a includes three bedrooms and one living room. It will be appreciated by one skilled in the art that the residential house 14a is merely an example, and other houses may be configured with increases or decreases in square footage, different cooling capacity, increases or decreases in air flow rate, cooling capacity, and/or the like, for example.

Figure 3:
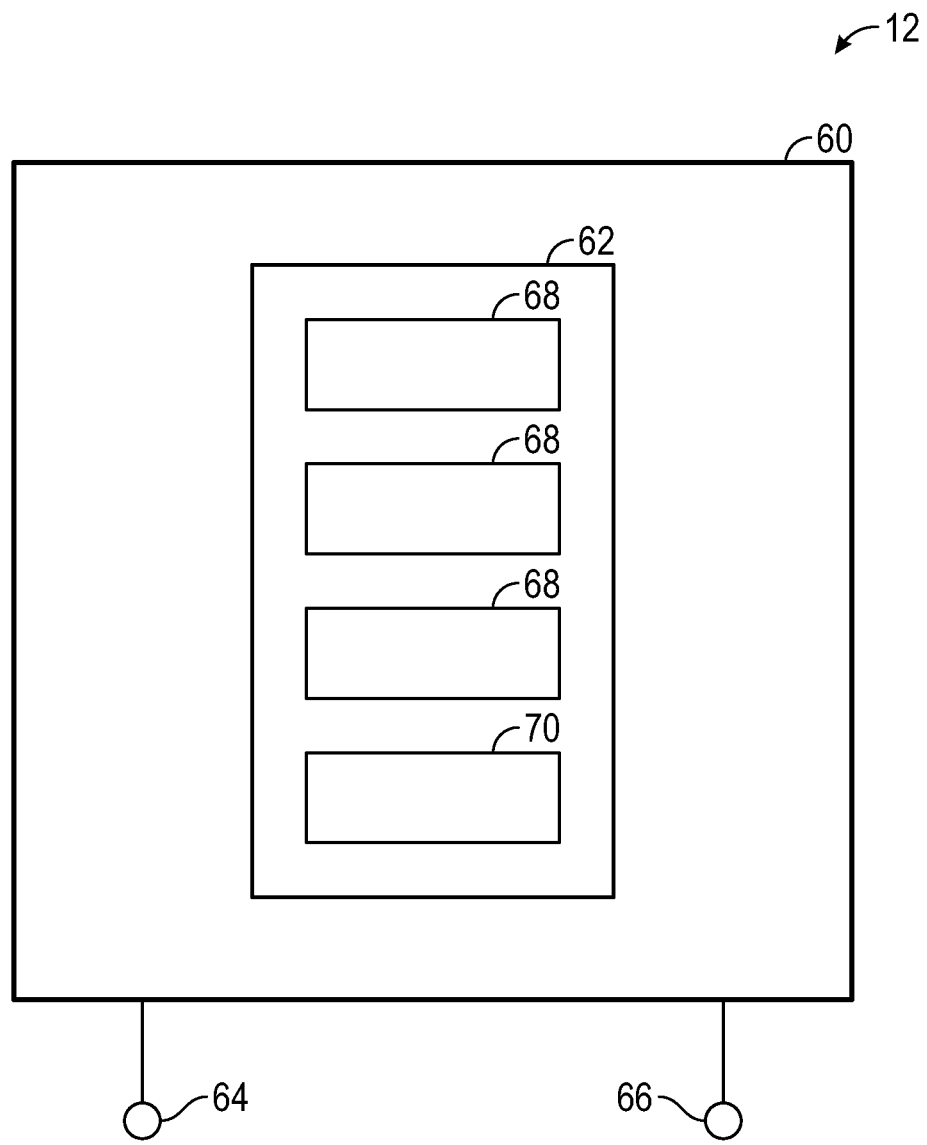
FIG. 3 is block diagram of an exemplary data acquisition system for use in the residential heating, ventilation, and air conditioning (HVAC) system illustrated in FIG. 1.

Referring to FIGS. 1, 2 and 3, the control system 12 may include one or more processors 60. The one or more processors 60 may work to execute processor executable code. The one or more processors 60 may be implemented as a single or plurality of processors working together or independently to execute the logic as described herein. Exemplary embodiments of the one or more processors 60 may include, but are not limited to, a digital signal processor (DSP), a central processing unit (CPU), a field programmable gate array (FPGA), a microprocessor, a multi-core processor, and/or combinations thereof, for example. In some embodiments, the one or more processors 60 may be incorporated into a smart device. The one or more processors 60 may be capable of communicating via the network 18 or a separate network (e.g., analog, digital, optical and/or the like). It is to be understood, that in certain non-limiting embodiments, using more than one processor, the processors 60 may be located remotely from one another, in the same location, or comprising a unitary multi-core processor. In some non-limiting embodiments, the one or more processors 60 may be partially or completely network-based or cloud-based, and may or may not be located in a single physical location. The one or more processors 60 may be configured to read and/or execute processor executable code and/or configured to create, manipulate, retrieve, alter and/or store data structure into one or more memories 62.

In some non-limiting embodiments, the one or more processors 60 may transmit and/or receive data via the network 18 to and/or from the internal surface temperature sensor(s) 16, the internal air temperature sensor(s) 24, the air diffuser sensor(s) 30, the external surface temperature sensor(s) 26, the air duct sensor(s) 33, the outdoor air temperature sensor(s) 28, the outdoor unit sensor(s) 22, the pyranometer(s) 40, the anemometer(s) 38, velocity sensor(s) 42, power meter(s) 46, external system(s) 29, combinations thereof, or the like. For example, the one or more processors 60 may transmit and/or receive data from the internal surface temperature sensor 16. In some non-limiting embodiments, the network 18 may transmit and/or receive data via the network 18 to and/or from one or more external system 29 (e.g., one or more external computer systems, one or more machine learning applications, artificial intelligence, cloud based system, microphones). For example, the one or more processors 60 may receive data from an external weather system, such as a mesonet network. Access methods include, but are not limited to, cloud access and direct download to the one or more processors 60 via the network 18, for example. In some non-limiting embodiments, the one or more processors 60 may be provided on a cloud cluster (i.e., a group of nodes hosted on virtual machines and connected within a virtual private cloud).

The one or more processors 60 may communicate via the network 18. The network 18 may be implemented as a wireless network, a local area network (LAN), a wide area network (WAN), a metropolitan network, a cellular network, a Global System of Mobile Communication (GSM) network, a code division multiple access (CDMA) network, a 4G network, a 5G network, a satellite network, a radio network, an optical network, an Ethernet network, combinations thereof, and/or the like. Additionally, the network 18 may use a variety of network protocols to permit bi-directional interface and/or communication of data and/or information. It is conceivable that in the near future, embodiments of the present disclosure may use more advanced networking topologies.

In some non-limiting embodiments, the one or more processors 60 may include one or more input devices 64 and one or more output devices 66. The one or more input devices 64 may be configured to receive information from a user, processor(s), and/or environment, and transmit such information to the one or more processors 60 and/or the network 18. The one or more input devices 64 may include, but are not limited to, implementation as a keyboard, touchscreen, mouse, trackball, microphone, fingerprint reader, infrared port, slide-out keyboard, flip-out keyboard, smart phone, cell phone, remote control, network interface, speech recognition device, gesture recognition device, combinations thereof, and/or the like.

The one or more output devices 66 may be configured to provide data in a form perceivable to a user and/or processors. The one or more output devices 66 may include, but are not limited to, implementations as a monitor, a screen, a touchscreen, a speaker, a website, a television set, a smart phone, a cell phone, a printer, a laptop computer, an optical head-mounted display, combinations thereof, and/or the like. In some non-limiting embodiments, the one or more input devices 64 and the one or more output devices 66 may be implemented as a single device, such as, for example, a touchscreen or tablet. Output data may include, for example, one or more input data (i.e., data provided to the control system 12) such as interior wall surface temperature, supply and return air temperatures from the supply air duct 32 or return air duct 35, air temperatures from supply air diffuser 34 or return air diffuser 36, wind speed, global horizontal solar irradiation, return air flow rate, power consumptions from the indoor HVAC unit 44 or outdoor HVAC unit 20, total power use of the entirety of the residential house 14, and the like. Output data may also include output data (i.e., data determined using methods described herein), such as, for example, optimized temperature for one or more areas of the residential house 14 determined via a home heat transfer model to provide the predicted space air temperature based on both thermal dynamics of space air and building structure within the virtual thermal envelope as described in detail herein.

The one or more processors 60 may be configured to read and/or execute processor executable code and/or configured to create, manipulate, retrieve, alter and/or store data structures into one or more memories 62. The one or more processors 60 may include one or more non-transient memory comprising processor executable code and/or software application(s). In some non-limiting embodiments, the one or more memories 62 may be located at the same physical location as the processor 60. Alternatively, one or more memories 62 may be located at a different physical location as the processor 60 and communicate with the processor 60 via a network, such as the network 18. Additionally, one or more memories 62 may be implemented as a "cloud memory" (i.e., one or more memories may be partially or completely based on or accessed using a network, such as the network 18). The one or more memories 62 may store processor executable code and/or information comprising one or more database 68 and program logic 70 (i.e., computer executable logic). In some non-limiting embodiments, the processor executable code may be stored as a data structure, such as a databased and/or data table, for example. In use, the one or more processor 60 may execute the program logic 70 controlling the reading, manipulation and/or storing of data as detailed in the methods described herein.

Referring to FIGS. 1 and 2, the internal surface temperature sensor 16 may include any temperature sensor configured to provide the interior wall surface temperature measurement to the control system 12. For example, the internal surface temperature sensor 16 may include, but is not limited to, a thermocouple, resistive temperature detector (RTD), thermistor, semiconductor-based sensor and/or the like. In some non-limiting embodiments, the internal surface temperature sensor 16 may be a sensor configured for attachment to a flat surface such as a T-type thermocouple. In some non-limiting embodiments, at least one surface of the internal surface temperature sensor 16 may be covered by one or more insulation materials. In some non-limiting embodiments, the one or more insulation materials may serve as an adhesive for attachment of the internal surface temperature sensor 16 to a wall of the residential house 14.

As illustrated in FIG. 2, the internal surface temperature sensor 16 is positioned on an interior surface 100 of an external wall 102 of the residential house 14. Additionally, positioning of the internal surface temperature sensor 16 is configured to avoid direct exposure to air supply diffuser(s) 34 and/or air return diffuser(s) 36. In some non-limiting embodiments, the internal surface temperature sensor 16 is positioned at a height between about five feet above the floor and about seven feet above the floor.

In some non-limiting embodiments, at least one of the internal surface temperature sensor(s) 16 is positioned on the interior surface 100 of an external wall 102 that comparatively receives the least solar impact. The selection of the external wall 102 is determined based on thermal interactions between the indoor and outdoor environment. For example, external walls 102 positioned in the cardinal direction of North generally do not receive direct solar radiation. As such, at least one of the internal surface temperature sensors 16 may be positioned on the interior surface 100 of the external wall 102 positioned at the cardinal direction of North.

Referring to FIGS. 1, 2 and 3, in some non-limiting embodiments, the internal surface temperature sensor 16 may communicate with a data acquisition system (DAQ) 104. For example, in some embodiments, the internal surface temperature sensor 16 may communicate with a DAQ Hat board as a signal converter for a localized processor (e.g., Raspberry Pi). Data may be provided to the DAQ 104 for signal conversion with the localized processor further transferring the data over the network 18 to the processor 60. In some non-limiting embodiments, the localized processor may be the processor 60 or at least one processor 60. In some non-limiting embodiments, the internal surface temperature sensor 16 may communicate data directly to the processor 60 via the network 18. In some embodiments, a data collection and monitoring software platform may be installed on the processor 60 for managing the transfer of data and communication between the internal surface temperature sensor 16, localized processor, and the processor 60. For example, the data collection and monitoring software platform Volttron developed at Pacific Northwest National Laboratory, headquartered in Richland, Wash., may be used to manage the transfer of data and communication between the internal surface temperature sensor 16, localized processor, and the processor 60.

The outdoor unit sensor 22 may be any temperature sensors configured to provide supply air and leaving air temperature measurements from the HVAC outdoor unit 20 to the control system 12. For example, the outdoor unit sensors 22 may include, but is not limited to, a thermocouple, resistive temperature detector (RTD), thermistor, semiconductor-based sensor, and/or the like. In some non-limiting embodiments, the outdoor unit sensors 22 may be T-type thermocouples.

The internal air temperature sensor 24 may be any temperature sensor configured to provide internal air temperature to the control system 12. For example, the internal surface temperature sensor 16 may include, but is not limited to, a thermocouple, resistive temperature detector (RTD), thermistor, semiconductor-based sensor, and/or the like. In some non-limiting embodiments, the internal air temperature sensor 24 may be a thermocouple such as a T-type thermocouple.

The exterior surface temperature sensor 26 and the outdoor air temperature sensor 28 may any temperature sensors configured to provide external surface temperature and external air temperature ($T_O$), respectively. For example, the exterior surface temperature sensor 26 may include, but is not limited to, a thermocouple, resistive temperature detector (RTD), thermistor, semiconductor-based sensor, and/or the like. In some non-limiting embodiments, the exterior surface temperature sensor 26 may be a thermocouple such as a T-type thermocouple. In some non-limiting embodiments, the external air temperature ($T_o$) may be provided via an external system 29, such as a mesonet network, for example.

The air duct sensor 33 may be any sensor configured to provide supply air temperature from at least one supply air duct 32 and/or return air temperature from at least one return air duct 35 to the control system 12. Further, the air duct sensor 33 may provide humidity measurements from the at least one supply air duct 32 and/or the return air duct 35. To that end, the air duct sensor 33 may include, but is not limited to, a humidity/temperature transmitter, a thermocouple, resistive temperature detector (RTD), thermistor, semiconductor-based sensor, and/or the like. In some non-limiting embodiments, the air duct sensor 33 may be the Humidity/Temperature Transmitter Model HX303AC, manufactured by Omega, having a principle place of business in Norwalk, Conn.

The air diffuser sensor 30 may be any temperature sensor configured to provide supply air temperature from at least one supply air diffuser 34 and/or return air temperature from at least one return air diffuser 36 to the control system 12. For example, the air diffuser sensor 30 may include, but is not limited to, a thermocouple, resistive temperature detector (RTD), thermistor, semiconductor-based sensor, and/or the like. In some non-limiting embodiments, the air diffuser sensor 30 may be a T-type thermocouple.

The velocity sensor 42 may be any sensor configured to provide return air flow rate at the supply air duct 32 or return air duct 35 to the control system 12. To that end, the velocity sensor 42 may be an air velocity transducer configured to provide air velocity measurements at the supply air duct 32 or return air duct 35.

The anemometer 38 may be any anemometer configured to provide wind speed (W) about the exterior of the residential house 14. The pyranometer 40 may be any pyranometer configured to provide measurement of the global horizontal solar irradiation (G) on the residential house 14. In some non-limiting embodiments, the anemometer 38 and the pyranometer 40 may be provided in a weather station. The weather station may be positioned on the exterior roof of the residential house 14, for example. In some non-limiting embodiments, the wind speed (W) and the global horizontal solar irradiation (G) may be provided via the external system 29, such as a mesonet network.

The power meter 46 may be any power meter configured to provide power consumption for the indoor HVAC unit 44 and/or the outdoor HVAC unit 20. Additionally, the power meter 46 may provide total house power measurements. In some non-limiting embodiments, the power meter 46 may be the WattNode Revenue for Modbus, manufactured by Continental Control Systems, LLC, having a principal place of business in Longmont, Colo.

Figure 4A:
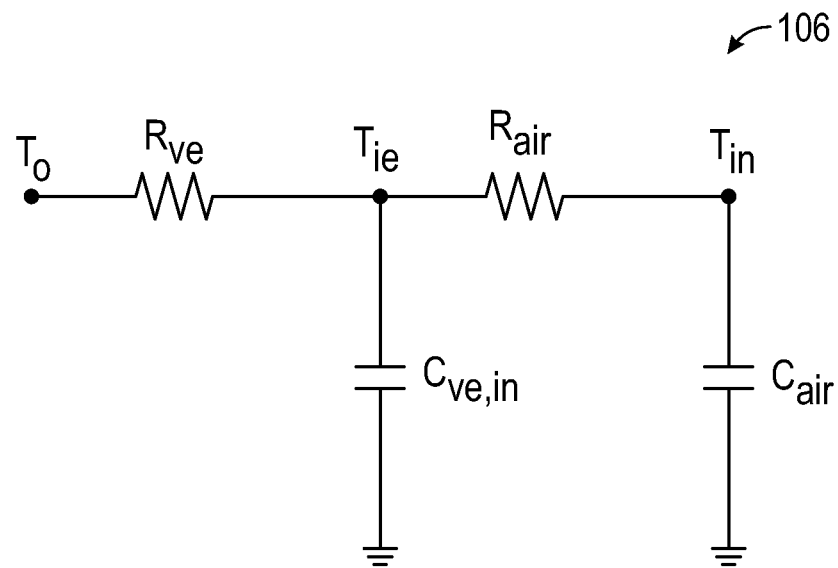
FIG. 4A is a circuit diagram illustrating a virtual thermal envelope in accordance with the present disclosure.

Referring to FIGS. 1, 2 and 4A, generally the control system 12 may determine a virtual thermal envelope for the residential house. In particular, the residential house 14 may be consolidated into a single virtual thermal envelope 106 with the interior wall surface temperature measurement ($T_{ie}$) represented by a weighted-average of impacts on elements within the virtual thermal envelope 106 having different orientations as shown in FIG. 4A. It should be noted that most residential houses 14 have one thermal zone composed of the entire home, and generally not more than two thermal zones, and as such, the entire residential house 14 may be consolidated into one virtual thermal envelope 106. The term 'thermal zone', as used herein, refers to a space of collection of spaces having similar space-conditioning requirements, the same heating and cooling setpoint, such that conditions may be maintained with a single thermal controlling device. One skilled in the art will appreciate that a second or third virtual thermal envelope 106 may be determined if needed based on design considerations of the residential house 14.

Figure 4B:
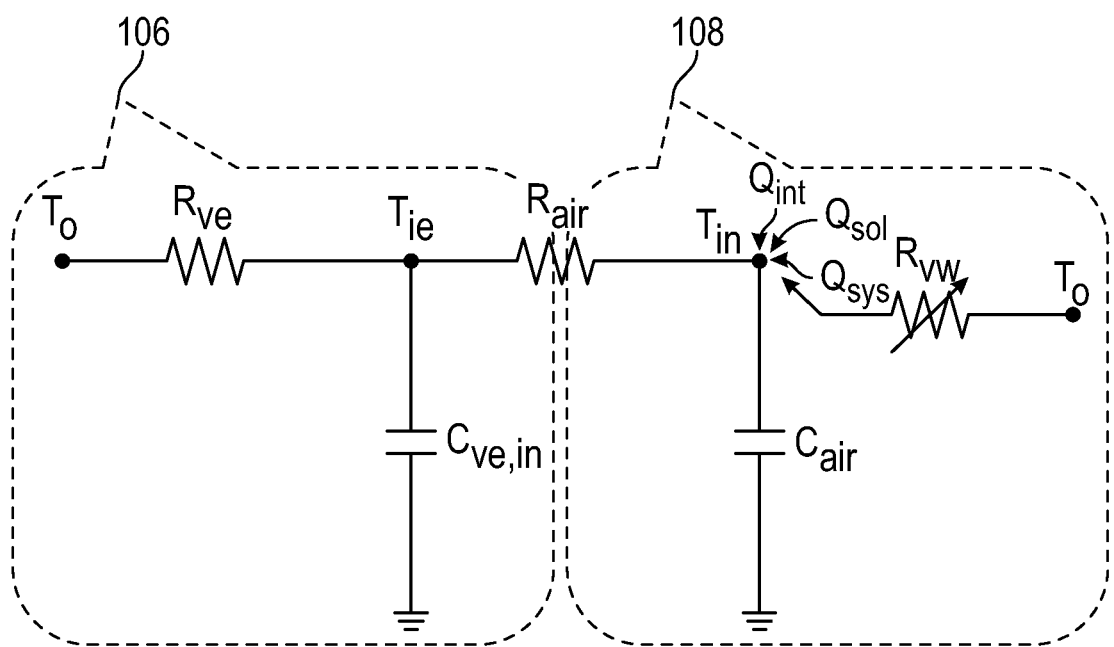
FIG. 4B is a circuit diagram illustrating a virtual thermal envelope and internal space in accordance with the present disclosure.

The thermal properties of the virtual thermal envelope 106 are the weighted average of thermal resistance $R_{ve}$ and heat capacity $C_{ve,in}$ of all components of the virtual thermal envelope. Referring to FIG. 4B, for internal space 108, the indoor air is represented by one uniform air temperature ($T_{in}$) in a thermal zone and the associated air thermal capacity ($C_{air}$) and thermal resistance ($R_{air}$). As used herein, the term "internal space" refers to indoor space enclosed by the virtual thermal envelope. To that end, the heat transmissions through all components of the virtual thermal envelope 106 and internal space 108 may be represented by two heat transfer relationships driven by the temperature difference between the outdoor air temperature ($T_o$) and the interior wall surface temperature measurement ($T_{ie}$), and driven by the temperature difference between the interior wall surface temperature measurement ($T_{ie}$) and the indoor air temperature ($T_{in}$), with the consolidated thermal properties of all components of the virtual thermal envelope 106 and internal space 108, as shown in EQS. 1 and 2:

$$C_{ve,in} \frac{dT_{ie}}{dt} = \frac{T_o - T_{ie}}{R_{ve}} + \frac{T_{in} - T_{ie}}{R_{air}} \quad \text{(EQ. 1)}$$

$$C_{air} \frac{dT_{in}}{dt} = \frac{T_{ie} - T_{in}}{R_{air}} \quad \text{(EQ. 2)}$$

Overall attenuation from the global horizontal solar irradiation (G) and solar heat received by all components of the virtual thermal envelope 106, including opaque and fenestration components, is represented by EQ. 3:

$$Q_{sol}(G) = a_1 G + a_2 G^2 + a_3 G^3 \quad \text{(EQ. 4)}$$

wherein $Q_{sol}(G)$ is the space air temperature increase representing solar impacts on the residential house 14, and $a_1$, $a_2$, and $a_3$ are empirically-determined coefficients using home operational data.

Wind impacts may also be provided using EQ. 4:

$$q'_{vw} = \frac{T_o - T_{in}}{1/(b'_1 W + b'_2 W^2)} = \frac{T_o - T_{in}}{R_{vw}} \quad \text{(EQ. 4)}$$

wherein $q'_{vw}$ is the heat transfer rate by wind effects, W is the wind speed, and $R_{vw}$ is a variable resistance dependent on wind speed and airtightness of the residential house 14. The quadratic equation of $(b'_1 W + b'_2 W^2)$ is used to capture wind impacts for each specific house with values of the parameters $b'_1$ and $b'_2$ estimated through data training are empirical coefficients.

By combining EQS. 1-4, the home heat transfer model for determination of the virtual thermal envelope 106 and internal space 108 may be expressed using EQ. 1 and EQ. 5:

$$C_{ve,in} \frac{dT_{ie}}{dt} = \frac{T_o - T_{ie}}{R_{ve}} + \frac{T_{in} - T_{ie}}{R_{air}} \quad \text{(EQ. 1)}$$

$$C_{air} \frac{dT_{in}}{dt} = \frac{T_{ie} - T_{in}}{R_{air}} + q'_{vw} + Q_{sol} + Q_{int} + Q_{sys} \quad \text{(EQ. 5)}$$

wherein $Q_{int}$ represents the sum of all internal heat gains and $Q_{sys}$ is HVAC output. The circuit diagram for EQS. 1 and 5 are illustrated in FIG. 4B showing the virtual thermal envelope 106 and the internal space 108.

A time-continuous model may be provided by substituting EQS. 3 and 4 into EQS. 1 and 5 providing:

$$\frac{dT_{ie}(t)}{dt} = \frac{1}{\tau_1}[T_o(t) - T_{ie}(t)] + \frac{1}{\tau_2}[T_{in}(t) - T_{ie}(t)] \quad \text{(EQ. 6)}$$

$$\frac{dT_{in}(t)}{dt} = \quad \text{(EQ. 7)}$$

$$-\frac{1}{\tau_3} T_{in}(t) + \frac{1}{\tau_3} \Big[ T_{ie}(t) + (T_o(t) - T_{in}(t))(b_1 W(t) + b_2 W^2(t)) +$$

$$(a_1 G(t) + a_2 G^2(t) + a_3 G^3(t)) + (Q_i u_i(t) + Q_s u_s(t)) \Big]$$

wherein $\tau_1 = C_{ve,in}$ and $\tau_3 = C_{air} R_{air}$ are the time constants of the virtual thermal envelope 106 and internal space 108 of the residential house 14, respectively; $\tau_2 = C_{ve,in} R_{air}$, $a_1 = a'_1 R_{air}$, $a_2 = a'_2 R_{air}$, $a_3 = a'_3 R_{air}$, $b_1 = b'_1 R_{air}$, and $b_2 = b'_2 R_{air}$ are the corresponding coefficients associated with $R_{air}$; and $Q_i = Q_{int} R_{air}$ and $Q_s = A_{sys} R_{air}$, wherein the internal heat gain $Q_{int}$ and HVAC system output $Q_{sys}$ may be treated as constant associated with the internal activity schedules $u_i$ and HVAC system power signal (i.e., on/off signal) $u_s$, respectively.

To use measured values for input and output data in accordance with the present disclosure, EQS. 6 and 7 may be converted into a discrete-time model by applying Euler's method to provide:

$$\frac{dT_{ie}(t)}{dt} = \frac{T_{ie}(t) - T_{ie}(t-1)}{\Delta t} \quad \text{(EQ. 8)}$$

$$\frac{dT_{in}(t)}{dt} = \frac{T_{in}(t) - T_{in}(t-1)}{\Delta t} \quad \text{(EQ. 9)}$$

wherein $\Delta t$ is the sampling interval between measurements. The continuous-time state equations may be approximately converted into discrete time:

$$T_{ie}(k) - T_{ie}(k-1) = \frac{\Delta t}{\tau_1}[T_o(k) - T_{ie}(k)] + \frac{\Delta t}{\tau_2}[T_{in}(k) - T_{ie}(k)] \quad \text{(EQ. 10)}$$

$$T_{in}(k) - T_{in}(k-1) = \quad \text{(EQ. 11)}$$

$$-\frac{\Delta t}{\tau_3} T_{in}(k) + \frac{\Delta t}{\tau_3} \Big[ T_{ie}(k) + (T_o(k) - T_{in}(k))(b_1 W(k) + b_2 W^2(k)) +$$

$$(a_1 G(k) + a_2 G^2(k) + a_3 G^3(k)) + (Q_i u_i(k) + Q_s u_s(k)) \Big]$$

wherein k denotes discrete time (i.e., each measurement sample time, k=1, 2, 3, n).

The control system 12 may estimate ten parameters of EQS. 10 and 11 using seven known data inputs including: indoor air temperature ($T_{in}$), outdoor air temperature ($T_o$), interior wall surface temperature ($T_{ie}$), wind speed (W), global horizontal solar irradiation (G), internal activity schedule ($u_i$), and HVAC system on/off signal ($u_s$). Internal activity schedule ($u_i$) includes activities of an occupant including, but not limited to, cooling, sleeping, and the like. Parameter estimation may be provided via a least square method or an optimization method. In some non-limiting embodiments, the least square model and the optimization model may be used to train one or more model parameters. In some non-limiting embodiments, the control system 12 may select between the least square method and optimization method based on seasons (i.e., Winter, Spring, Summer, Fall) and/or improve model performance of one method (e.g., least square method) for one season based on results obtained by the other method (e.g., optimization method) during that season.

To identify values of the parameters, EQ. 10 may be provided in matrix form:

$$X\beta = Y \quad \text{(EQ. 12)}$$

wherein X and Y are the matrices containing measured variables, whose elements are the inputs and output of the home heat transfer model, and $\beta$ is the matrix of constant coefficients (i.e., unknown parameters to be estimated). If X has full column rank, the least square solution to EQ. 12 is:

$$\hat{\beta} = (X^T X)^{-1} X^T Y \quad \text{(EQ. 13)}$$

wherein $\hat{\beta}$ is the optimal estimate of the unknown parameters, and:

$$X = \begin{pmatrix} x_{11} & \cdots & x_{1m} \\ \vdots & \ddots & \vdots \\ x_{n1} & \cdots & x_{nm} \end{pmatrix} \quad \text{(EQ. 14)}$$

$$\beta = \begin{bmatrix} \beta_1 \\ \vdots \\ \beta_m \end{bmatrix} \quad \text{(EQ. 15)}$$

$$Y = \begin{bmatrix} y_1 \\ \vdots \\ y_n \end{bmatrix} \quad \text{(EQ. 16)}$$

wherein n represents sampling data in time steps and m represents different combination of measured variables of EQ. 10.

Figure 5:
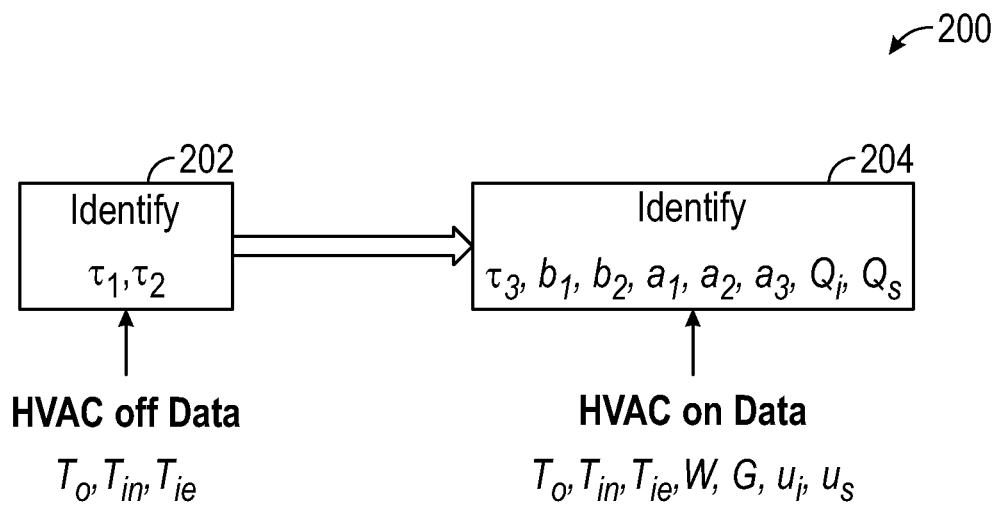
FIG. 5 is a flow diagram of an exemplary method of parameter estimation using a least square method in accordance with the present disclosure.

FIG. 5 illustrates a flow chart 200 of an exemplary method of parameter estimation using a least square method in accordance with the present disclosure. In a step 202, the parameters of $\tau_1$ and $\tau_2$ may be identified using a least squares model formed by EQ. 10. Measurements of indoor air temperature $T_{in}(k)$, outdoor air temperature $T_o(k)$, and interior wall surface temperature $T_{ie}(k)$, in time periods wherein the HVAC system is off may be obtained and provided to the control system 12. In a step 204, the parameters of $\tau_3$, $b_1$, $b_2$, $a_1$, $a_2$, $a_3$, $Q_i$, and $Q_s$ are determined by solving another least square model formed via EQ. 11 and all the measurements obtained and provided to the control system 12 at each time step.

Using the optimization model, the input values as shown in step 202 and 204 of FIG. 5 are similar. In the optimization model, the parameters of $\pi_1$ and $\pi_2$ are identified by solving an optimization model formed using EQ. 17 and measurements obtained and provided to the control system 12 including measurements of indoor air temperature $T_{in}(k)$, outdoor air temperature $T_o(k)$, and interior wall surface temperature $T_{ie}(k)$, using all measurements at each time step. The difference between measured and modeled interior wall surface temperature over unknown parameters and initial conditions of the system may be minimized by:

$$\min_P J = \sum_{k=1}^{N} \left(T^k_{ie_{model}} - T^k_{ie}\right)^2 \quad \text{where } P = \left[\tau_1, \tau_2, T^0_{ie}, T_{in_{measure}}\right] \quad \text{(EQ. 17)}$$

The cost function may be minimized using sequential least square programming (SLSQP) or Nelder-Mead's algorithm. Using the SLSQP algorithm, system variables may be constrained and/or bound using data provided by a user. In some non-limiting embodiments, constraints for the system variables may be initially determined using the least square method shown in FIG. 5. For example, a relationship between the values of $\tau_1$ and $\tau_2$ may be determined using the least square method shown in FIG. 5 such that the user may provide, for example, the constraint of:

$$5 \le \frac{\tau_1}{\tau_2} \le 20 \quad \text{(EQ. 18)}$$

Using EQ. 13 and measurements at each time step, the parameters of $\tau_3$, $b_1$, $b_2$, $a_1$, $a_2$, $a_3$, $Q_i$, and $Q_s$ are then determined in the optimization method.

In some non-limiting embodiments, the estimations of parameters obtain via the optimization method or least squares method may be collected for a pre-determined amount of time (e.g., six days, fourteen days) to further evaluate and train the home heat transfer model. The trained home heat transfer model may then be applied to operational data collected by the control system 12. In some non-limiting embodiments, evaluation and training of the home heat transfer model may be provided during transitions between seasons. For example, training of the home heat transfer model may be provided on data collected in May during the transition from Spring to Summer. The trained home heat transfer model may then be applied to operational data collected in June, July and August to provide predicted space air temperature. In some non-limiting embodiments, the predicted space air temperature may be used to predict at least twenty-hour hours ahead of the actual space air temperature. In some non-limiting embodiments, the predicted space air temperature derived using the methods described herein may be compared with measured spaced air temperature to verify effectiveness of the home heat transfer model. If the absolute error between the measured space air temperature and predicted space air temperature is outside of a predetermined threshold (e.g., greater than 2 F at a 90% confidence level), an error message may be delivered to a user via the control system 12.

Figure 6:
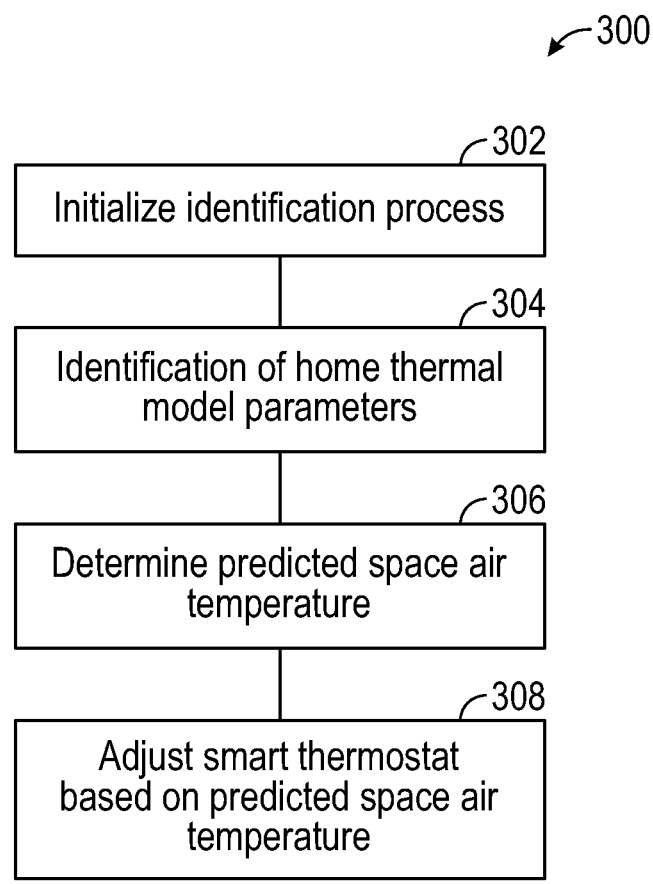
FIG. 6 is a flow diagram of an exemplary method for determining predicted space temperature in accordance with the present disclosure.

FIG. 6 illustrates a flow chart 300 of an exemplary method for determining predicted space air temperature in accordance with the present disclosure. In a step 302, the control system 12 may initialize an identification process. Generally, at 12:00 a.m. on day 0, the identification process begins wherein defined values for variable data for the home heat transfer model may be identified and/or determined. Additionally, variables may be assigned an initial value prior to running the home heat transfer model (e.g., constraints as described herein). In a step 304, the control system 12 may be configured to provide home heat transfer model parameter identification as described in detail herein. In some non-limiting embodiments, the home heat transfer model parameter identification may be executed at least once per twenty-four-hour period (i.e., 12:00 a.m. on day one, day two, day 3, . . . , day n). In a step 306, the predicted space air temperature may be determined using the home heat transfer model and identified parameters as described in detail herein. The predicted space air temperature may provide a prediction at least twenty-four hours prior to the actual space air temperature. In a step 308, via smart home grid-interactive operations, one or more thermostat 19 may be adjusted based on the predicted space air temperature.

In at least certain embodiments, the present disclosure is directed to HVAC systems and methods of using the HVAC systems within a residential house. The systems may include at least one internal surface temperature sensor configured to provide an interior wall surface temperature measurement at a pre-determined time period. The system may also include at least one internal air temperature sensor configured to provide an internal air temperature measurement at the pre-determined time period, an internal HVAC unit having a first power measurement, an outdoor HVAC unit having a second power measurement, a thermostat configured to adjust temperature within the residential house, and a control system in communication over a network with the internal surface temperature sensor, the internal air temperature sensor, the indoor HVAC unit, the outdoor HVAC unit, and the thermostat. The control system has one or more non-transitory computer readable medium storing a set of computer executable instructions for running on one or more processors that when executed cause the one or more processors to obtain the interior wall surface temperature measurement, internal air temperature measurement, an outdoor temperature measurement, a global horizontal solar irradiation measurement, wind speed measurement, the first power measurement, and the second power measurement. The control system determines a virtual thermal envelope for the residential house and applies a home heat transfer model to the virtual thermal envelope to determine a predicted space air temperature. The home heat transfer model is based on thermal dynamics of space air and building structure using the interior surface temperature, internal air temperature measurement, an outdoor temperature measurement, a global horizontal solar irradiation measurement, wind speed measurement, the first power measurement, and the second power measurement. The control system adjusts the thermostat based on the predicted space air temperature.

In at least certain embodiments, the present disclosure is directed to an HVAC system within a residential house having at least one internal surface temperature configured to provide an interior wall surface temperature measurement at a pre-determined time period. The internal surface temperature sensor is positioned on an interior surface of an external wall of the residential house. The HVAC system also includes a control system in communication over a network with the internal surface temperature sensor. The control system has one or more non-transitory computer readable medium storing a set of computer executable instructions for running on one or more processors that when executed cause the one or more processors to obtain the interior wall surface temperature measurement and apply a home heat transfer model to determine a predicted space air temperature. The home heat transfer model is based on thermal dynamics of space air and building structure and uses the interior wall surface temperature measurement.

In at least certain embodiments, the present disclosure is directed to a method that includes the step of transmitting interior wall surface temperature measurement from at least one interior wall surface sensor positioned on an interior surface of an external wall of a residential house to a control system via a network. The method also includes the step of determining, by a control system, a predicted space air temperature of a virtual thermal envelope of the residential house using a home heat transfer model based on thermal dynamics of air within the virtual envelope and structural components of the residential house within the virtual thermal envelope. The home heat transfer model uses the interior wall surface temperature measurement to determine the predicted space air temperature. The method also includes the step of adjusting a thermostat based on the predicted space air temperature.

It will be understood from the foregoing description that various modifications and changes may be made in the various embodiments of the present disclosure without departing from their true spirit. Similarly, changes may be made in the formulation of the various components and compositions described herein, the methods described herein or in the steps or the sequence of steps of the methods described herein without departing from the spirit and scope of the present disclosure. The description provided herein is intended for purposes of illustration only and is not intended to be construed in a limiting sense. Thus, while the present disclosure has been described herein in connection with certain embodiments so that aspects thereof may be more fully understood and appreciated, it is not intended that the present disclosure be limited to these particular embodiments. On the contrary, it is intended that all alternatives, modifications and equivalents are included within the scope of the inventive concepts as defined herein. Thus the examples described above, which include particular embodiments, will serve to illustrate the practice of the present disclosure, it being understood that the particulars shown are by way of example and for purposes of illustrative discussion of particular embodiments only and are presented in the cause of providing what is believed to be a useful and readily understood description of procedures as well as of the principles and conceptual aspects of the inventive concepts.

1. F. C. McQuiston, J. D. Parker, and J. D. Spitler. Heating, Ventilating, and Air-Conditioning Analysis and Design, 5$^{th}$ ed., John Wiley and Sons, Inc., 2000, ISBN 0-471-35098
2. J. Kosny, T. Petrie, D. Gawin, P. Childs, A. Desjarlais, and J. Christian. Thermal Mass-Energy Savings Potential in Resident Buildings. Oak Ridge National Laboratory, Oak Ridge, Tennessee, USA, 2001.
3. H. Johra and P. Heiselberg. Influence of Internal Thermal Mass on the Indoor Thermal Dynamics and Integration of Phase Change Materials in Furniture for Building energy Storage: A Review. *Renewable and Sustainable Energy Reviews* 69 (2017): 19-32.
4. J. J. Kim and J. W. Moon. Impact of Insulation on Building Energy Consumption. In the 17$^{th}$ International IBPSA Conference, International Building Performance Simulation Association, Glasgow, Scotland, UK, July 2009.

What is claimed is:

1. A heating, ventilation and air conditioning (HVAC) system within a residential house, comprising:
    at least one internal surface temperature sensor configured to provide an interior wall surface temperature measurement at a pre-determined time period;
    at least one internal air temperature sensor configured to provide an internal air temperature measurement at the pre-determined time period;
    an indoor HVAC unit having a first power measurement;
    an outdoor HVAC unit having a second power measurement;
    a thermostat configured to adjust temperature within the residential house;
    a control system in communication over a network with the at least one internal surface temperature sensor, the at least one internal air temperature sensor, the indoor HVAC unit, the outdoor HVAC unit, and the thermostat, the control system having one or more non-transitory computer readable medium storing a set of computer executable instructions for running on one or more processors that when executed cause the one or more processors to:
        obtain the interior wall surface temperature measurement, internal air temperature measurement, an outdoor temperature measurement, a global horizontal solar irradiation measurement, wind speed measurement, the first power measurement, and the second power measurement; and
        regulate the thermostat using a home heat transfer model to produce a predicted space air temperature, the home heat transfer model based on thermal dynamics of space air and building structure using the interior wall surface temperature measurement, internal air temperature measurement, an outdoor temperature measurement, a global horizontal solar irradiation measurement, the first power measurement, and the second power measurement.

2. The HVAC system of claim 1, wherein the outdoor temperature measurement is provided via an outdoor temperature sensor, the global horizontal solar irradiation measurement is provided via a pyranometer positioned on a roof of the residential house, and the wind speed measurement is provided via an anemometer positioned on a roof of the residential house.

3. The HVAC system of claim 1, wherein the outdoor temperature measurement, global horizontal solar irradiation measurement and wind speed measurement are provided via a mesonet network system in communication with the control system.

4. The HVAC system of claim 1, wherein the at least one internal surface temperature sensor is positioned on an interior surface of an external wall of the residential house.

5. The HVAC system of claim 4, wherein each external wall of the residential house has a solar impact and wherein the at least one internal surface temperature sensor is positioned on the external walls having the least solar impact.

6. The HVAC system of claim 5, wherein the at least one internal surface temperature sensor is positioned on the external wall positioned at cardinal direction North.

7. The HVAC system of claim 1, wherein the at least one internal surface temperature sensor communicates with the control system via a data acquisition system.

8. The HVAC system of claim 1, wherein the at least one internal surface temperature sensor is a T-type thermocouple configured to be attached to an interior surface of an external wall of the residential house.

9. The HVAC system of claim 1, wherein the virtual thermal envelope includes all thermal zones of the residential house.

10. The HVAC system of claim 1, wherein the set of computer executable instructions cause the one or more processors to train parameters of the home heat transfer model using a least square model.

11. The HVAC system of claim 1, wherein the set of computer executable instructions cause the one or more processors to train parameters of the home heat transfer model using an optimization model.

12. The HVAC system of claim 1, wherein the set of computer executable instructions cause the one or more processors to train parameters of the home heat transfer model using a least square model and an optimization model.

13. The HVAC system of claim 12, wherein training parameters of the home heat transfer model occurs during transition between at least two seasons.

14. The HVAC system of claim 1, wherein the predicted space air temperature predicts actual space air temperature at least twenty-four hours before actual space air temperature based on current conditions.

15. A heating, ventilation and air conditioning (HVAC) system within a residential house, comprising:
  at least one internal surface temperature sensor configured to provide an interior wall surface temperature measurement at a pre-determined time period, the at least one internal surface temperature sensor positioned on an interior surface of an external wall of the residential house;
  a thermostat configured to adjust temperature within the residential house;
  a control system in communication over a network with the at least one internal surface temperature sensor, the control system having one or more non-transitory computer readable medium storing a set of computer executable instructions for running on one or more processors that when executed cause the one or more processors to:
    obtain the interior wall surface temperature measurement; and
    regulate the thermostat using a home heat transfer model to produce a predicted space air temperature, the home heat transfer model based on thermal dynamics of space air and building structure using the interior wall surface temperature measurement.

16. The HVAC system of claim 15, wherein the home heat transfer model is applied to a virtual thermal envelope of the residential house, the virtual thermal envelope consisting of all structural elements separating conditioned indoor spaces from unconditioned indoor spaces within the residential house.

17. The HVAC system of claim 16, wherein the control system is configured to communicate with a thermostat to adjust temperature of the virtual thermal envelope based on the predicted space air temperature.

18. The HVAC system of claim 16, the set of computer executable instructions cause the one or more processors to:
  initialize an identification process at midnight of a first day; and
  identify parameters of the home heat transfer model at least once per twenty-four hour period.

19. A method, comprising:
  transmitting an interior wall surface temperature measurement from at least one interior wall surface sensor positioned on an interior surface of an external wall of a residential house to a control system via a network;
  regulate, by the control system, a thermostat using a home heat transfer model to produce a predicted space air temperature in the residential house, the home heat transfer model based on thermal dynamics of air within the residential house, the home heat transfer model using the interior wall surface temperature measurement to determine the predicted space air temperature.

20. The method of claim 19, wherein each external wall of the residential house has a solar impact and the at least one interior wall surface sensor is positioned on the external wall having the least solar impact.

* * * * *